US010462670B2

(12) United States Patent
Aminaka

(10) Patent No.: US 10,462,670 B2
(45) Date of Patent: Oct. 29, 2019

(54) RADIO TERMINAL APPARATUS AND METHOD THEREFOR

(71) Applicant: NEC CORPORATION, Tokyo (JP)

(72) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/562,759

(22) PCT Filed: Nov. 30, 2015

(86) PCT No.: PCT/JP2015/005935
§ 371 (c)(1),
(2) Date: Sep. 28, 2017

(87) PCT Pub. No.: WO2016/157266
PCT Pub. Date: Oct. 6, 2016

(65) Prior Publication Data
US 2018/0084425 A1    Mar. 22, 2018

(30) Foreign Application Priority Data

Mar. 30, 2015 (JP) .................................. 2015-069028

(51) Int. Cl.
*H04L 29/06* (2006.01)
*H04W 12/08* (2009.01)
(Continued)

(52) U.S. Cl.
CPC .......... *H04W 12/08* (2013.01); *H04L 63/104* (2013.01); *H04W 72/048* (2013.01);
(Continued)

(58) Field of Classification Search
CPC ... H04W 12/08; H04W 76/14; H04W 72/048; H04W 84/18; H04L 63/104
See application file for complete search history.

(56) References Cited

U.S. PATENT DOCUMENTS

| 7,181,614 B1 * | 2/2007 | Gehrmann | ............ H04L 63/065 709/249 |
| 10,045,191 B2 * | 8/2018 | Nguyen | ................ H04W 76/14 |

(Continued)

FOREIGN PATENT DOCUMENTS

| JP | H 10-135965 | 5/1998 |
| JP | 2003-513513 A | 4/2003 |

(Continued)

OTHER PUBLICATIONS

Goratti, Leonardo, et al. "A novel device-to-device communication protocol for public safety applications." 2013 IEEE Globecom Workshops (GC Wkshps). IEEE, 2013. (Year: 2013).*

(Continued)

*Primary Examiner* — Shawnchoy Rahman
(74) *Attorney, Agent, or Firm* — Finnegan, Henderson, Farabow, Garrett & Dunner, L.L.P.

(57) ABSTRACT

A radio terminal apparatus (113) is configured to perform D2D communication with at least one radio terminal (121-124) belonging to a second group (group 2) when a predetermined condition is satisfied. The predetermined condition includes that a first radio terminal (110) belonging to a first group (group 1) to which the radio terminal apparatus (113) belongs gives the second group (group 2) implicit or explicit permission to perform D2D communication between the first and second groups (groups 1 and 2). It is thus, for example, possible to contribute to improving security of device-to-device (D2D) communication performed between D2D communication groups.

17 Claims, 9 Drawing Sheets

(51) Int. Cl.
    *H04W 84/18*    (2009.01)
    *H04W 72/04*    (2009.01)
    *H04W 76/14*    (2018.01)
    *H04W 40/20*    (2009.01)
    *H04W 92/18*    (2009.01)
    *H04W 8/00*    (2009.01)
    *H04L 29/08*    (2006.01)
    *H04W 4/08*    (2009.01)

(52) U.S. Cl.
    CPC .......... *H04W 76/14* (2018.02); *H04W 84/18* (2013.01); *H04L 67/16* (2013.01); *H04W 4/08* (2013.01); *H04W 8/005* (2013.01); *H04W 40/20* (2013.01); *H04W 72/04* (2013.01); *H04W 92/18* (2013.01)

(56) References Cited

U.S. PATENT DOCUMENTS

| | | | | |
|---|---|---|---|---|
| 10,111,267 | B2* | 10/2018 | Agiwal | H04W 76/14 |
| 2012/0093098 | A1 | 4/2012 | Charbit et al. | |
| 2012/0322484 | A1* | 12/2012 | Yu | H04W 4/08 |
| | | | | 455/509 |
| 2014/0307642 | A1* | 10/2014 | Wanstedt | H04W 72/1289 |
| | | | | 370/329 |
| 2015/0124646 | A1* | 5/2015 | Yun | H04W 4/06 |
| | | | | 370/254 |
| 2016/0183212 | A1* | 6/2016 | Suzuki | H04W 16/14 |
| | | | | 370/330 |
| 2016/0261569 | A1* | 9/2016 | Glassco | H04L 63/0876 |
| 2016/0270088 | A1* | 9/2016 | Martin | H04W 76/14 |

FOREIGN PATENT DOCUMENTS

| | | |
|---|---|---|
| JP | 2007-013386 A | 1/2007 |
| JP | 2008-131564 A | 6/2008 |
| WO | WO 2015/020386 A1 | 2/2015 |
| WO | WO 2015/020602 A1 | 2/2015 |
| WO | WO 2015/020603 A1 | 2/2015 |
| WO | WO 2015/113645 A1 | 8/2015 |
| WO | WO 2015/019940 A1 | 12/2015 |

OTHER PUBLICATIONS

International Search Report dated Feb. 23, 2016, in corresponding PCT International Application.
3GPP TS 23.303 V12.3.0 (Dec. 2014), 3$^{rd}$ Generationa Partnership Project; Technical Specification Group Services and System Aspects; Proximity-based services (ProSe); Stage 2 (Release 12), pp. 1-62, (2014).
3GPP TSG RAN WG1 Meeting #76 R1-140516, "Radio Resource Sharing Between Public Safety Groups Using D2D", pp. 1-4, (2013).
Notification of Reasons for Refusal, issued in Japanese Application No. 2017-508802, dated Jul. 9, 2019.
Decision to Grant a Patent of the counterpart Japanese Patent Application No. 2017-508802 dated Sep. 3, 2019.

* cited by examiner

RADIO TERMINAL APPARATUS AND METHOD THEREFOR

CROSS-REFERENCE TO RELATED PATENT APPLICATIONS

This application is a National Stage Entry of International Application No. PCT/JP2015/005935, filed Nov. 30, 2015, which claims priority from Japanese Patent Application No. 2015-069028, filed Mar. 30, 2015. The entire contents of the above-referenced applications are expressly incorporated herein by reference.

TECHNICAL FIELD

The present application relates to an inter-terminal direct communication (i.e., device-to-device (D2D) communication) and, in particular, to D2D communication between D2D communication groups.

BACKGROUND ART

In some implementations, a radio terminal is configured to directly communicate with other radio terminals. Such communication is called device-to-device (D2D) communication. The D2D communication includes at least one of direct communication and direct discovery. In some implementations, a plurality of radio terminals supporting D2D communication form a D2D communication group autonomously or under the control of a network, and perform communication in the formed D2D communication group.

A Proximity-based services (ProSe) direct discovery and ProSe direct communication specified in the 3GPP Release 12 are examples of the D2D communication (see, for example, Non-patent Literature 1). ProSe Direct Discovery is performed through a procedure in which a radio terminal capable of performing ProSe (i.e., ProSe-enabled UE) detects another ProSe-enabled UE by using only the capability of a radio communication technology (e.g., Evolved Universal Terrestrial Radio Access (E-UTRA) technology) possessed by these UEs. ProSe direct discovery may be performed by three or more ProSe-enabled UEs.

ProSe direct communication enables establishment of a communication path between two or more ProSe-enabled UEs existing in a direct communication range after the ProSe discovery procedure is performed. In other words, ProSe direct communication enables a ProSe-enabled UE to directly communicate with another ProSe-enabled UE, without communicating through a Public Land Mobile Network (PLMN) including a base station (eNodeB). ProSe direct communication may be performed by using a radio communication technology that is also used to access a base station (an eNodeB) (i.e., E-UTRA technology) or by using a wireless local area network (WLAN) radio technology (i.e., IEEE 802.11 radio technology).

In the 3GPP Release 12, a ProSe function communicates with a ProSe-enabled UE through a Public Land Mobile Network (PLMN) and assists ProSe direct discovery and ProSe direct communication. The ProSe function is a logical function that is used for PLMN-related operations required for ProSe. The functionality provided by the ProSe function includes, for example: (a) communication with third-party applications (a ProSe Application Server), (b) authentication of a UE for ProSe direct discovery and ProSe direct communication, (c) transmission of configuration information for ProSe direct discovery and ProSe direct communication (e.g., ProSe Application ID, ProSe UE ID, ProSe Layer-2 Group ID) to a UE, and (d) provision of network-level discovery (i.e., EPC-level ProSe discovery). The ProSe function may be implemented in one or more network nodes or entities.

CITATION LIST

Non Patent Literature

Non-patent Literature 1: 3GPP TS 23.303 V12.3.0 (2014-December), "3rd Generation Partnership Project; Technical Specification Group Services and System Aspects; Proximity-based services (ProSe); Stage 2 (Release 12)", December 2014

SUMMARY OF INVENTION

Technical Problem

As described above, in some implementations, D2D communication is performed among radio terminals within a single D2D communication group. For example, in the case of ProSe direct communication, each D2D communication group is distinguished by a ProSe Layer-2 Group ID. The ProSe Layer-2 Group ID is a link-layer identifier for identifying each group in one-to-many ProSe direct communication. The ProSe Layer-2 Group ID is used as a destination Layer-2 ID of all the packets that a UE transmits to that group for one-to-many ProSe direct communication. The ProSe Layer-2 Group ID may be pre-configured in each UE. Alternatively, when a UE is in-coverage, the ProSe Layer-2 Group ID may be configured in the UE via signaling between the UE and a ProSe function.

In general, since radio terminals have mobility, D2D communication between radio terminals tends to be disconnected. Further, radio terminals belonging to the same D2D communication group are not always present within an adjacent range in which they can perform D2D communication and, accordingly, a radio terminal cannot always detect another radio terminal belonging to the D2D communication group to which it belongs. Therefore, in order to improve the stability of D2D communication, it may be preferable that when a radio terminal detects disconnection of communication with another radio terminal in a first D2D communication group to which it belongs and cannot detect any radio terminal in that the first D2D communication group, it can perform D2D communication with a radio terminal belonging to a second D2D communication group and can indirectly communicate with a radio terminal in the first D2D communication group through the second D2D communication group.

However, if D2D communication between D2D communication groups is always permitted, it may lead to a weakening of security. One of the objects to be attained by embodiments disclosed herein is to provide an apparatus, a method, and a program that contribute to improving security of D2D communication performed between D2D communication groups.

Solution to Problem

In a first aspect, a radio terminal apparatus includes at least one radio transceiver and at least one processor coupled to the at least one radio transceiver. The at least one processor is configured to perform device-to-device (D2D) communication by using the at least one radio transceiver. The at least one processor is configured to perform D2D communication with at least one radio terminal belonging to a second group when a predetermined condition is satisfied. The predetermined condition includes that a first radio terminal belonging to a first group to which the radio terminal apparatus belongs gives, to the second group different from the first group, implicit or explicit permission to perform D2D communication between the first and second group.

In a second aspect, a radio terminal apparatus includes at least one radio transceiver and at least one processor coupled to the at least one radio transceiver. The at least one processor is configured to perform device-to-device (D2D) communication by using the at least one radio transceiver. The at least one processor is configured to, when a predetermined condition including that a first radio terminal belonging to a first group, which is a different than a second group to which the radio terminal apparatus belongs, gives the second group implicit or explicit permission to perform D2D communication between the first and second groups is satisfied, perform D2D communication with a second radio terminal that belongs to the first group and is different from the first radio terminal.

In a third aspect, a radio terminal apparatus includes at least one radio transceiver and at least one processor coupled to the at least one radio transceiver. The at least one processor is configured to perform device-to-device (D2D) communication by using the at least one radio transceiver. The at least one processor is configured to, when the radio terminal apparatus cannot communicate with any radio terminal belonging to a first group to which the radio terminal apparatus belongs, perform D2D communication with a first radio terminal belonging to a second group different from the first group and give implicit or explicit permission to the second group. The implicit or explicit permission permits the second group to perform D2D communication with a radio terminal that belongs to the first group and is different from the radio terminal apparatus.

In a fourth aspect, a method performed by a radio terminal apparatus includes performing D2D communication with at least one radio terminal belonging to a second group when a predetermined condition is satisfied, the predetermined condition including that a first radio terminal belonging to a first group to which the radio terminal apparatus belongs gives, to the second group different from the first group, implicit or explicit permission to perform D2D communication between the first and second groups.

In a fifth aspect, a method performed by a radio terminal apparatus includes, when a predetermined condition including that a first radio terminal belonging to a first group, which is a different than a second group to which the radio terminal apparatus belongs, gives the second group implicit or explicit permission to perform D2D communication between the first and second groups is satisfied, performing D2D communication with a second radio terminal that belongs to the first group and is different from the first radio terminal.

In a sixth aspect, a method performed by a radio terminal apparatus includes, when the radio terminal apparatus cannot communicate with any radio terminal belonging to a first group to which the radio terminal apparatus belongs, performing D2D communication with a first radio terminal belonging to a second group different from the first group and giving the second group implicit or explicit permission. The implicit or explicit permission permits the second group to perform D2D communication with a radio terminal that belongs to the first group and is different from the radio terminal apparatus.

In a seventh aspect, a program includes a set of instructions (software codes) that, when loaded into a computer, causes the computer to perform a method according to the above-described fourth, fifth or sixth aspect.

Advantageous Effects of Invention

According to the above-described aspect, it is possible to provide an apparatus, a method, and a program that contribute to improving security of D2D communication performed between D2D communication groups.

DESCRIPTION OF EMBODIMENTS

Specific embodiments are explained hereinafter in detail with reference to the drawings. The same or corresponding elements are denoted by the same symbols throughout the drawings, and duplicated explanations are omitted as necessary for the sake of clarity.

First Embodiment

Figure 1:
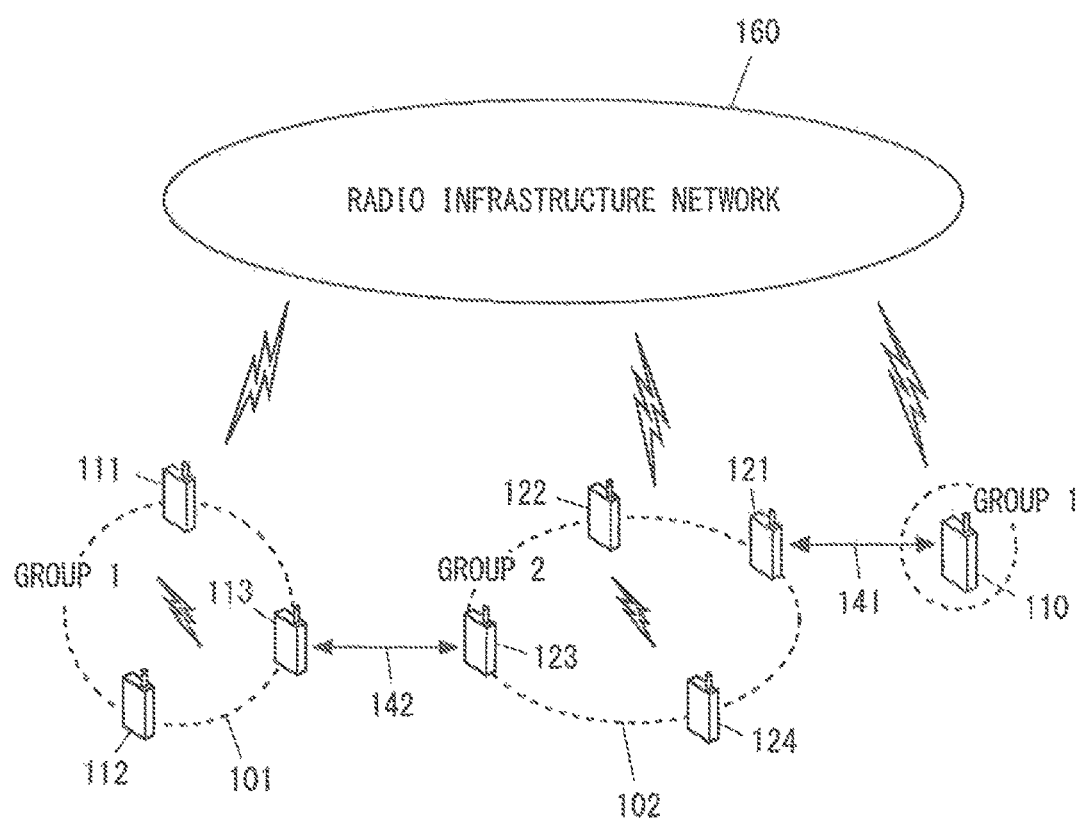
FIG. 1 shows a configuration example of a radio network according to some embodiments.

FIG. 1 shows a configuration example of a network according to this embodiment. Radio terminals 110 to 113 belong to the same D2D communication group (i.e., group 1) and are configured to perform D2D communication within the group 1. Radio terminals 121 to 124 belong to the same D2D communication group (i.e., group 2) and are configured to perform D2D communication within the group 2. At least one of the radio terminals 110 to 113 is configured to communicate with a radio infrastructure network 160. Similarly, at least one of the radio terminals 121 to 124 is configured to communicate with the radio infrastructure network 160.

The radio infrastructure network 160 provides communication that is more continuous than D2D communication between radio terminals. The radio infrastructure network 160 may include a public cellular network such as a Universal Mobile Telecommunications System (UMTS), a Long Term Evolution (LTE), a CDMA2000 (1×RTT, High Rate Packet Data (HRPD)) system, a Global System for Mobile communications (GSM (Registered Trademark))/General packet radio service (GPRS) system, a WiMAX (IEEE 802.16-2004), or a mobile WiMAX (IEEE 802.16e-2005). Additionally or alternatively, the radio infrastructure network 160 may include an infrastructure-mode Wireless Local Area Network (WLAN) (IEEE 802.11) such as a public WLAN.

Next, inter-group D2D communication in this embodiment is explained hereinafter. The radio terminals 110 to 113 belonging to the group 1 and the radio terminals 121 to 124 belonging to the group 2 are configured to perform inter-group D2D communication 141 and 142.

In the example shown in FIG. 1, the radio terminals 111 to 113 belong to the same D2D communication group (group 1) and are geographically adjacent to each other, thereby forming a terminal cluster 101 and performing intra-group one-to-one or one-to-many D2D communication within their group. Similarly, the radio terminals 121 to 124 belong to the same D2D communication group (group 2) and are geographically adjacent to each other, thereby forming a terminal cluster 102 and performing intra-group one-to-one or one-to-many D2D communication within their group. In contrast to this, as for the radio terminal 110 belonging to the group 1, there is no other radio terminal 111 or 112 belonging to the group 1 in its geographically adjacent range. Therefore, the radio terminal 110 cannot perform intra-group D2D communication.

When the radio terminal 110 cannot communicate with any radio terminal belonging to the same D2D communication group as the radio terminal 110 belongs (i.e., group 1), it performs inter-group D2D communication 141 with a radio terminal (e.g., radio terminal 121) belonging to another D2D communication group (e.g., group 2). Further, the radio terminal 110 gives the group 2 implicit or explicit permission. The implicit or explicit permission permits the group 2 to perform D2D communication with a radio terminal belonging to the group 1, to which the radio terminal 110 belongs.

In some implementations, the implicit or explicit permission may be given to the group 2 by the radio terminal 110 by requesting a radio terminal in the group 2 (e.g., radio terminal 121) to perform D2D communication.

Additionally or alternatively, the permission may be given to the group 2 by the radio terminal 110 by performing D2D communication with a radio terminal in the group 2 (e.g., radio terminal 121).

Additionally or alternatively, the permission may be given to the group 2 by the radio terminal 110 by notifying a radio terminal in the group 2 (e.g., radio terminal 121) of a communication setting necessary for D2D communication between the groups 1 and 2. This communication setting includes an identifier related to the group 1, or radio resource information, or both. The identifier related to the group 1 may be a group identifier for identifying each D2D communication group such as a ProSe Layer-2 Group ID.

Additionally or alternatively, the permission may be given to the group 2 by the radio terminal 110 by asking a radio terminal in the group 2 (e.g., radio terminal 121) for transmission of data packets to the group 1.

Additionally or alternatively, the permission may be given to the group 2 by the radio terminal 110 by transmitting explicit permission information to a radio terminal in the group 2 (e.g., radio terminal 121).

Each of the radio terminals 121 to 124 belonging to the group 2 is configured to, when a predetermined condition including that the radio terminal 110 of another D2D communication group (i.e., group 1) gives the group 2 implicit or explicit permission is satisfied, perform inter-group D2D communication 142 with a radio terminal that belongs to the group 1 and is different from the radio terminal 110 (e.g., radio terminal 113). Note that as can be understood from FIG. 1, the radio terminal 123 in the group 2 that performs the inter-group D2D communication 142 with another radio terminal in the group 1 (e.g., radio terminal 113) may be different from the radio terminal 121 that performs the inter-group D2D communication 141 with the radio terminal 110 and receives the implicit or explicit permission from the radio terminal 110.

Each of the radio terminals 111 to 113 within the cluster 101 belonging to the group 1 is configured to perform inter-group D2D communication with at least one radio terminal belonging to another D2D communication group (e.g., radio terminals 121 to 124) when the predetermined condition, which includes that the radio terminal 110 belonging to the same D2D communication group as the radio terminals 111 to 113 gives implicit or explicit permission to the other D2D communication group (e.g., group 2), is satisfied. Each of the radio terminals 111 to 113 may detect that it cannot communicate with the radio terminal 110 directly or through other radio terminals belonging to the group 1. In this case, the above-described predetermined condition for determining whether to start inter-group D2D communication may include a condition in which a radio terminal cannot communicate with the radio terminal 110 directly or through other radio terminals belonging to the group 1. In this way, each of the radio terminals 111 to 113 in the terminal cluster 101 can perform inter-group D2D communication when it is necessary to use inter-group D2D communication to communicate with the radio terminal 110.

Figure 2:
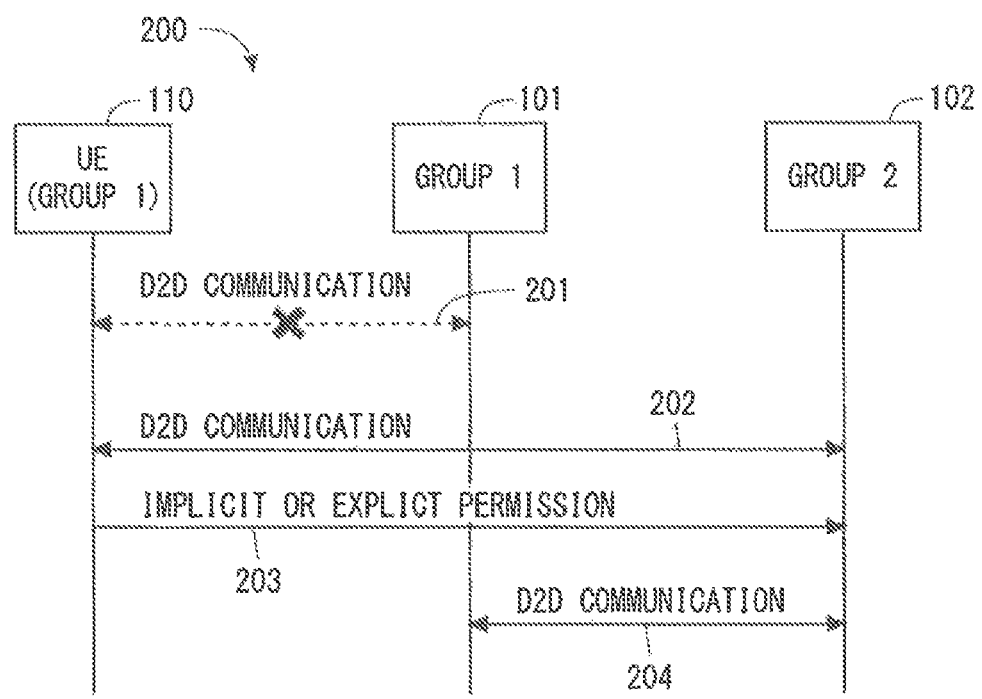
FIG. 2 is a sequence diagram showing an example of an inter-group D2D communication procedure according to a first embodiment.

FIG. 2 is a sequence diagram showing an example (Process 200) of an inter-group D2D communication procedure according to this embodiment. In block 201, the radio terminal (UE) 110 detects that it cannot communicate with any of the radio terminals 111 to 113 (the terminal cluster 101) belonging to the same group 1 as the radio terminal 110 belongs. In block 201, the radio terminal 110 detects one of the radio terminals 121 to 124 (the terminal cluster 102) belonging to a different D2D communication group (i.e., group 2) than the radio terminal 110 and performs inter-group D2D communication with a radio terminal in this group 2. In block 203, the radio terminal 110 gives implicit or explicit permission to one or more of radio terminals belonging to the group 2 (i.e., terminal cluster 102). In block 204, inter-group D2D communication is performed between the group 1 (i.e., terminal cluster 101) and the group 2 (i.e., terminal cluster 102) in accordance with the implicit or explicit permission issued by the radio terminal 110.

Figure 3:
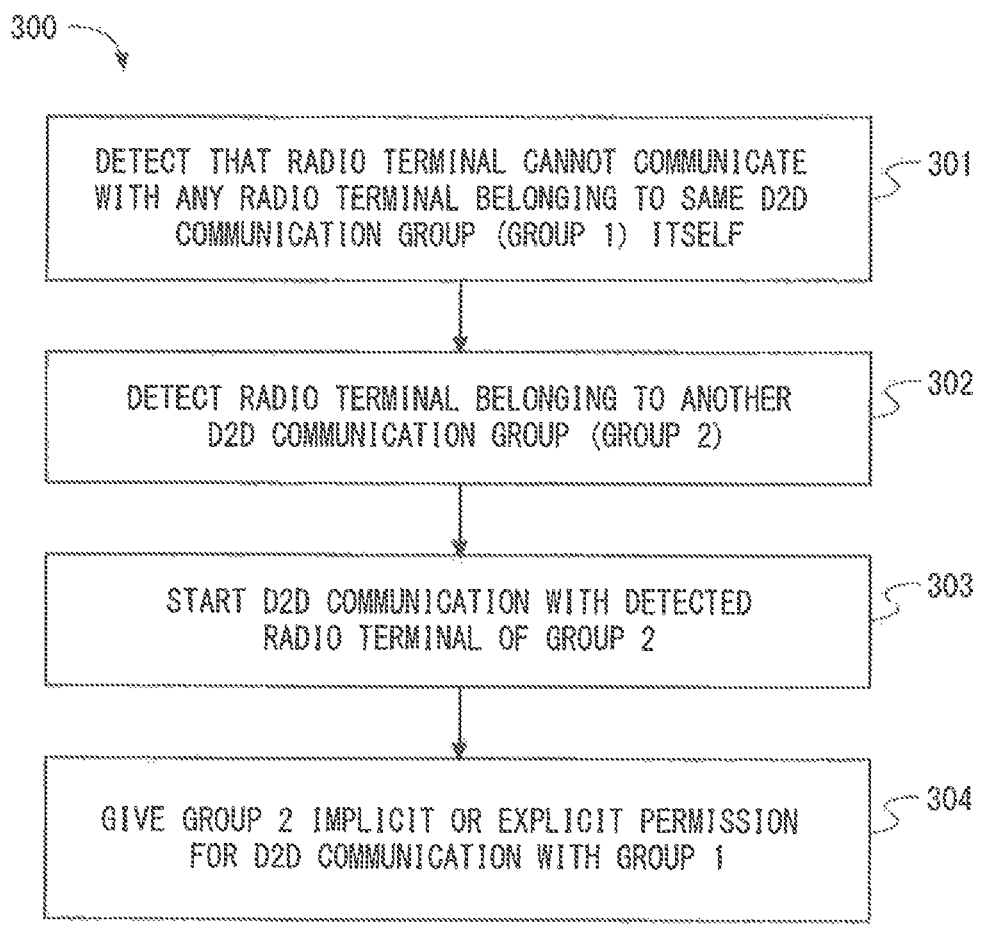
FIG. 3 is a flowchart showing an example of an operation of a radio terminal according to the first embodiment.

FIG. 3 is a flowchart showing an example (Process 300) of an operation of the radio terminal 110. In block 301, the radio terminal 110 detects that it cannot communicate with any radio terminal belonging to the same D2D communication group (i.e., group 1) as the radio terminal 110. For example, the radio terminal 110 may detect that it cannot communicate with any radio terminal belonging to the group 1 in response to receiving no response, although the radio terminal 110 has transmitted a detection signal for the group 1 a predetermined number of times.

In block 302, the radio terminal 110 detects a radio terminal (e.g., radio terminal 121) belonging to another D2D communication group (i.e., group 2). In block 303, the radio terminal 110 starts inter-group D2D communication with the detected radio terminal of the group 2 (e.g., radio terminal 121). In block 304, the radio terminal 110 gives the group 2 the implicit or explicit permission to perform D2D communication with the group 1.

Figure 4:
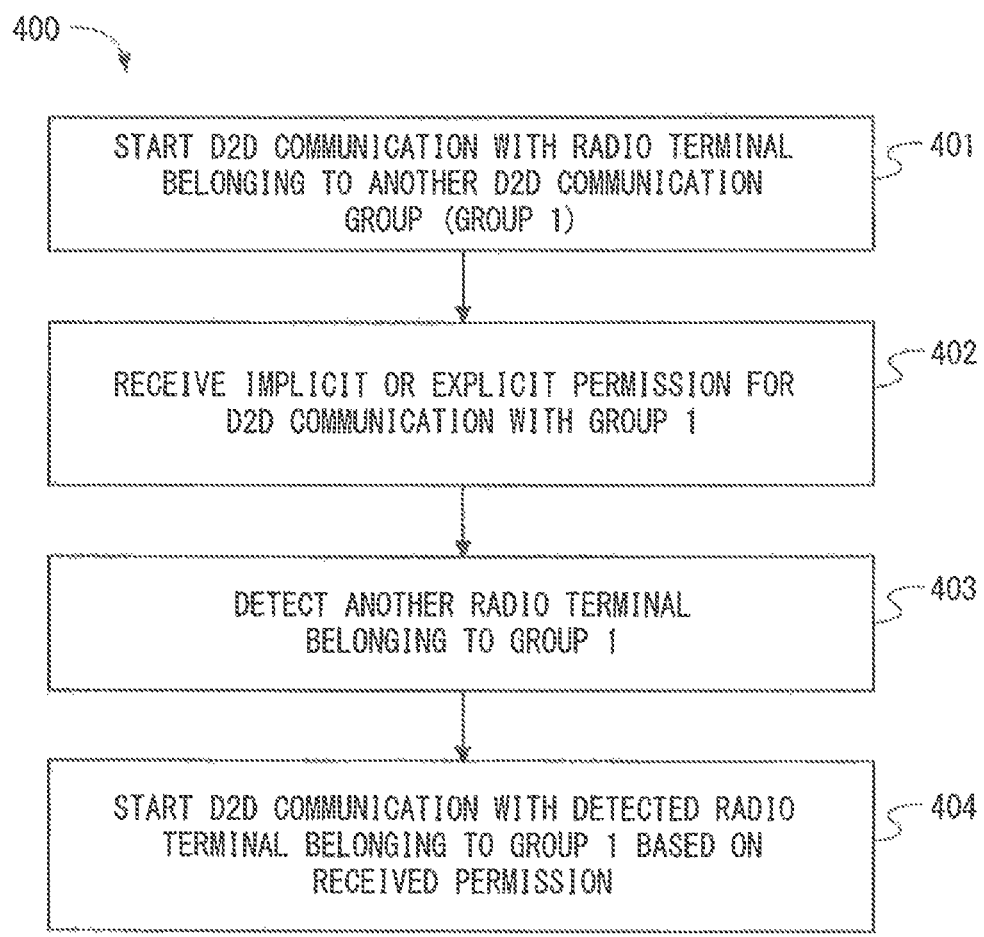
FIG. 4 is a flowchart showing an example of an operation of a radio terminal according to the first embodiment.

FIG. 4 is a flowchart showing an example (Process 400) of an operation of the radio terminals 121 to 124 in the terminal cluster 102 belonging to the group 2. In block 401, a radio terminal of the group 2 (e.g., radio terminal 121) starts inter-group D2D communication with the radio terminal 110 belonging to another D2D communication group (i.e., group 1). In block 402, a radio terminal of the group 2 (e.g., radio terminal 121) receives from the radio terminal 110 the implicit or explicit permission for D2D communication with the group 1. In block 403, a radio terminal of the group 2 (e.g., radio terminal 123) detects another radio terminal (e.g., radio terminal 113) that belongs to the group 1 and is different from the radio terminal 110. In block 404, a radio terminal of the group 2 (e.g., radio terminal 123) starts inter-group D2D communication with the detected radio terminal belonging to the group 1 (e.g., radio terminal 113) based on the implicit or explicit permission for the inter-group D2D communication issued by the radio terminal 110.

In block 404, a radio terminal of the group 2 (e.g., radio terminal 123) may confirm that it has obtained the permission for the inter-group D2D communication with the group 1. Note that as already described, the implicit permission may be a fact that the radio terminal of the group 2 (e.g., radio terminal 123) has a communication setting for the inter-group D2D communication with the group 1, or may be a fact that the radio terminal of the group 2 (e.g., radio terminal 123) stores a data packet(s) destined for a radio terminal belonging to the group 1. In these cases, the radio terminal of the group 2 (e.g., radio terminal 123) does not have to explicitly confirm the presence/absence of the permission for the inter-group D2D communication.

Figure 5:
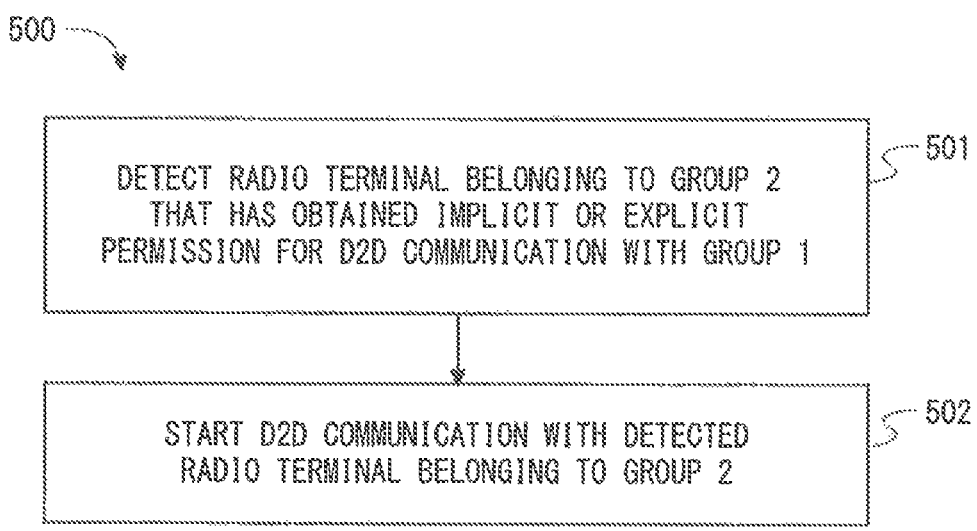
FIG. 5 is a flowchart showing an example of an operation of a radio terminal according to the first embodiment.

FIG. 5 is a flowchart showing an example (Process 500) of an operation of the radio terminals 111 to 113 in the terminal cluster 101 belonging to the group 1. In block 501, a radio terminal in the terminal cluster 101 (e.g., radio terminal 113) detects a radio terminal belonging to the group 2 (e.g., radio terminal 123). As already described, the group 2 has already obtained the implicit or explicit permission for D2D communication with the group 1 from the radio terminal 110. In block 502, the radio terminal in the terminal cluster 101 starts inter-group D2D communication with the detected radio terminal of the group 2 (e.g., radio terminal 123) based on the implicit or explicit permission for inter-group D2D communication issued by the radio terminal 110.

In block 501, the radio terminal of the group 1 (e.g., radio terminal 113) may confirm that the group 2 has obtained the permission for the inter-group D2D communication. Note that as already described, the implicit permission may be a fact that a radio terminal of the group 2 (e.g., radio terminal 123) has a communication setting for the inter-group D2D communication with the group 1, or may be a fact that a radio terminal of the group 2 (e.g., radio terminal 123) stores a data packet(s) destined for a radio terminal belonging to the group 1. In these cases, the radio terminal of the group 1 (e.g., radio terminal 113) does not have to explicitly confirm that the radio terminal belonging to the group 2 (e.g., radio terminal 123) has the permission for the inter-group D2D communication.

As can be understood from the above description, in this embodiment, when the radio terminal 110 belonging to the group 1 cannot perform D2D communication with any radio terminal belonging to the group 1 (e.g., radio terminals 111 to 113), the radio terminal 110 communicates with a detected radio terminal (e.g., radio terminal 121) belonging to another D2D communication group (i.e., group 2) and gives the permission for the group 2 to perform inter-group D2D communication with the group 1. Then, a radio terminal (e.g., radio terminal 113) that belongs to the group 1 and is included in the terminal cluster 101 performs inter-group D2D communication with a radio terminal (e.g., radio terminal 123) that belongs to the group 2 and is included in the terminal cluster 102.

That is, in this embodiment, when a predetermined condition including that the radio terminal 110 belonging to the group 1 gives the group 2 the implicit or explicit permission is satisfied, inter-group communication between another radio terminal (e.g., radio terminal 113) belonging to the group 1 and a radio terminal (e.g., radio terminal 123) belonging to the group 2 is performed. Therefore, radio terminals in the group 1 can operate to accept inter-group D2D communication only when the radio terminal 110 is isolated from the group 1 and thus gives the group 2 implicit or explicit permission (i.e., asks for assistance from the group 2). As a result of this, it is possible to prevent the weakening of security compared to an operation in which the inter-group D2D communication is always permitted.

Note that in some implementations, each of the radio terminals 110 to 113 belonging to the group 1 may be configured to perform D2D communication within the group 1 by using a dedicated radio resource exclusively configured for the group 1 and perform inter-group D2D communication by using a common radio resource commonly configured for a plurality of groups including the groups 1 and 2. Similarly, each of the radio terminals 121 to 124 belonging to the group 2 may be configured to perform D2D communication within the group 2 by using a dedicated radio resource exclusively configured for the group 2 and perform inter-group D2D communication by using a common radio resource commonly configured for a plurality of groups including the groups 1 and 2. In this way, it is possible to prevent interference between intra-group D2D communication and inter-group D2D communication.

In some implementations, each of the radio terminals 110 to 113 belonging to the group 1 may be configured to restrict communication quality or communication contents in inter-group D2D communication compared to that in D2D communication performed within the group 1. Similarly, each of the radio terminals 121 to 124 belonging to the group 2 may be configured to restrict communication quality or communication contents in inter-group D2D communication compared to that in D2D communication performed within the group 2. For example, a communication rate (throughput), a data privilege level, an accessible level, or applications can be used, or any combination of them may be restricted in inter-group D2D communication.

In this embodiment, there is no restriction on a high-layer protocol (e.g., routing protocol) that is used for data transfer within a D2D communication group and data transfer between D2D communication groups. That is, various known protocols related to a wireless multi-hop network may be used. The wireless multi-hop network includes a mobile ad-hoc network (MANET) and a disruption tolerant network (DTN). The Disruption tolerant network is also referred to as a delay tolerant network or a disconnect tolerant network.

Second Embodiment

This embodiment provides a more specific example of the inter-group D2D communication procedure explained in the first embodiment, in particular, a method for carrying out a communication setting for inter-group D2D communication. A configuration example of a radio network according to this embodiment is the same as that shown in FIG. 1. In this embodiment, each of the radio terminals 110 to 113 belonging to the group 1 and the radio terminals 121 to 124 belonging to the group 2 is configured to receive a communication setting related to inter-group D2D communication from the radio infrastructure network 160.

Figure 6:
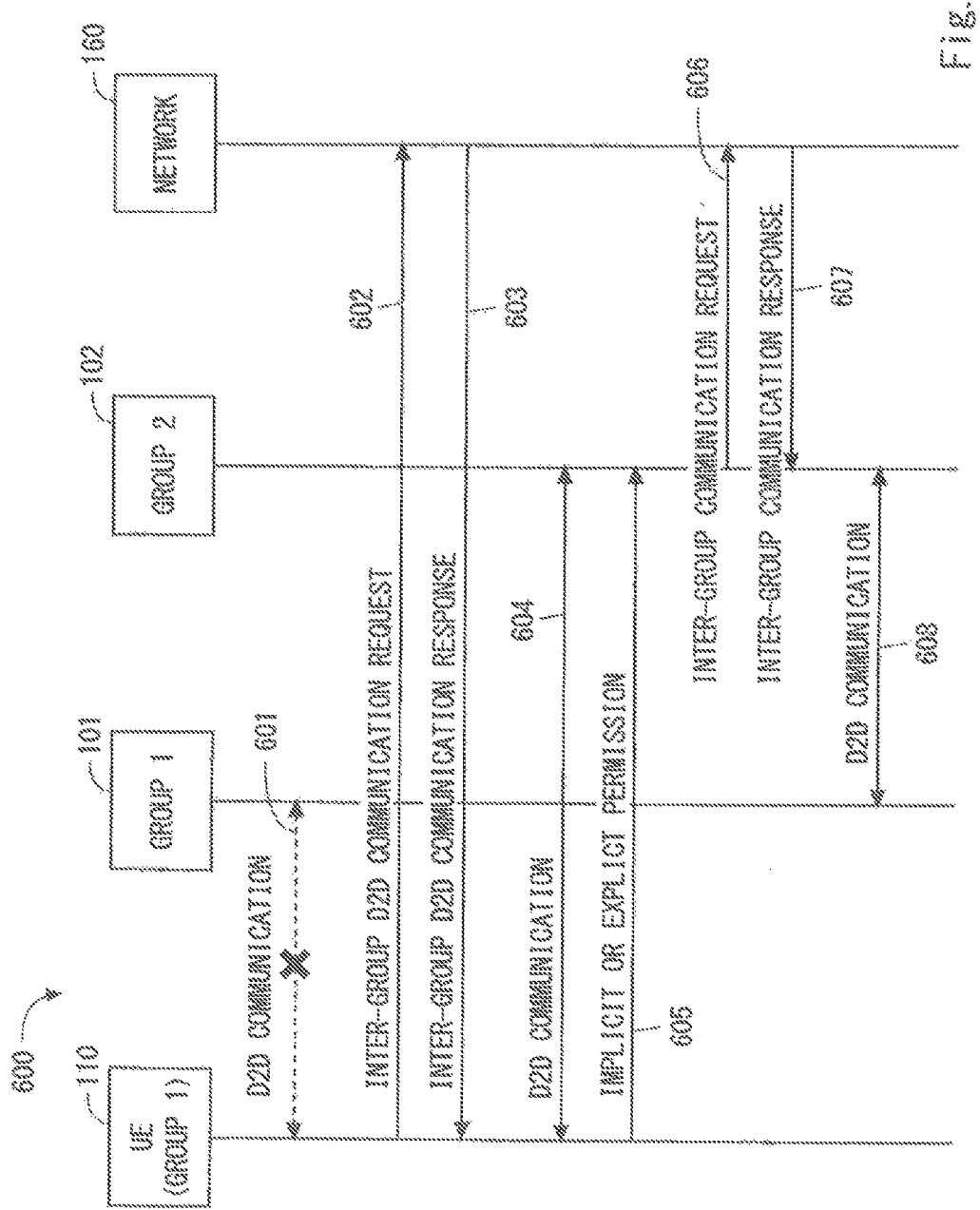
FIG. 6 is a sequence diagram showing an example of an inter-group D2D communication procedure according to a second embodiment.

FIG. 6 is a sequence diagram showing an example (Process 600) of an inter-group D2D communication procedure according to this embodiment. In Block 601, similar to block 201 in FIG. 2, the radio terminal (UE) 110 determines that it cannot communicate with any of the radio terminals 111 to 113 (the terminal cluster 101) belonging to the same group 1 as the radio terminal 110. In block 602, the radio terminal 110 transmits a request for inter-group D2D communication to an entity located in the radio infrastructure network 160. In some implementations, the radio terminal 110 may transmit the request for inter-group D2D communication to a base station such as an eNodeB, or to a control entity for D2D communication such as a ProSe function.

In response receiving the request for inter-group D2D communication transmitted from the radio terminal 110, the entity in the radio infrastructure network 160 may select a counterpart group with which the radio terminal 110 should perform inter-group D2D communication (e.g., group 2). This selection may be performed based on a distance between the radio terminal 110 and a radio terminal belonging to the group 2. For example, the entity in the radio infrastructure network 160 may detect a radio terminal that is located within a geographical range from the radio terminal 110 in which D2D communication can be performed and select a D2D communication group to which the detected radio terminal belongs.

Additionally or alternatively, the selection of the counterpart group (e.g., group 2) may be performed based on the type of an application used by the radio terminal 110 in the D2D communication. For example, the entity in the radio infrastructure network 160 may select a D2D communication group that supports use of an application used in D2D communication within the group 1 to which the radio terminal 110 belongs.

Additionally or alternatively, the selection of the counterpart group (e.g., group 2) may be performed based on an attribute of the radio terminal 110 or an attribute of the D2D communication group to which the radio terminal 110 belongs (i.e., group 1). For example, the entity in the radio infrastructure network 160 may select a D2D communication group having the same attribute as the radio terminal 110 (or the group 1) has. The public safety use case is one of main use cases of D2D communication. Accordingly, the attribute of the radio terminal 110 (or the group 1) may indicate, for example, an organization to which the radio terminal 110 belongs, such as a rescue-team group and a police group. The attribute of the radio terminal 110 (or the group 1) may indicate a nation or a region to which the radio terminal 110 belongs.

In block 603, the entity in the radio infrastructure network 160 transmits to the radio terminal 110 a response to the request for the inter-group D2D communication. This response includes a communication setting for the inter-group communication with the group 2 selected by the entity in the radio infrastructure network 160. This communication setting includes a group identifier (e.g., ProSe Layer-2 Group ID) of the group 2, or radio resource information, or both. The entity in the radio infrastructure network 160 may ask a radio terminal in the selected group 2 for the communication setting to determine or acquire the communication setting (e.g., group identifier or radio resource).

Processes in blocks 604 and 605 in FIG. 6 are similar to those in blocks 202 and 203 in FIG. 2.

In block 606, a radio terminal in the terminal cluster 102 belonging to the group 2 (e.g., radio terminal 123) transmits a request for inter-group D2D communication with the group 1 to the entity in the radio infrastructure network 160. In block 607, the radio terminal belonging to the group 2 (e.g., radio terminal 123) receives from the entity in the radio infrastructure network 160 a response to the request for the inter-group D2D communication. This response includes a communication setting for the inter-group communication with the group 1. This communication setting includes a group identifier (e.g., ProSe Layer-2 Group ID) of the group 1, or radio resource information, or both.

A process in block 608 in FIG. 6 is similar to that in block 204 in FIG. 2.

According to this embodiment, a radio terminal acquires a communication setting for D2D communication when it needs to perform the inter-group D2D communication and thus can use the communication setting suitable for the environment and the condition in which the D2D communication is performed.

Third Embodiment

This embodiment provides a more specific example of the inter-group D2D communication procedure explained in the first embodiment, in particular, a method for carrying out a communication setting for inter-group D2D communication. A configuration example of a radio network according to this embodiment is the same as that shown in FIG. 1. In this embodiment, each of the radio terminals 110 to 113 belonging to the group 1 is configured to receive a communication setting related to inter-group D2D communication from one of the radio terminals 121 to 124 belonging to the group 2.

Figure 7:
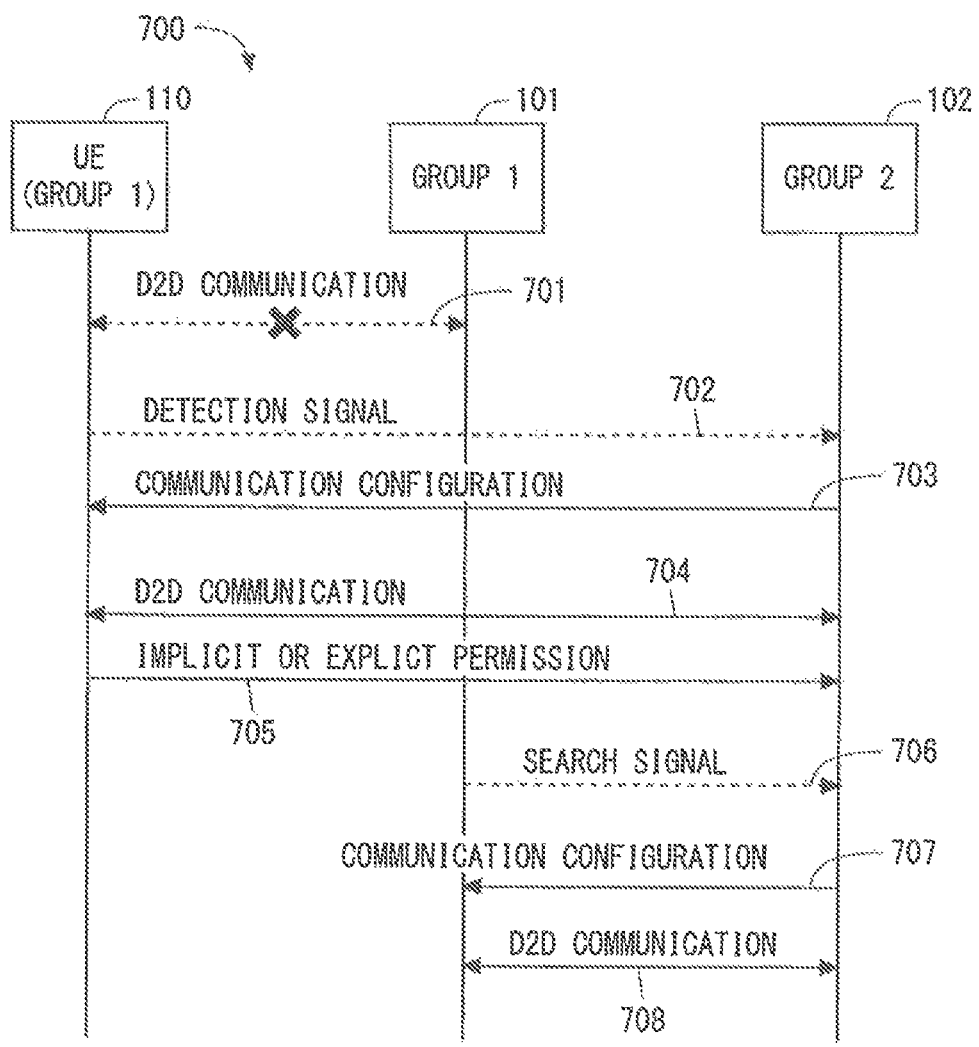
FIG. 7 is a sequence diagram showing an example of an inter-group D2D communication procedure according to a third embodiment.

FIG. 7 is a sequence diagram showing an example (Process 700) of an inter-group D2D communication procedure according to this embodiment. In Block 701, similar to block 201 in FIG. 2, the radio terminal (UE) 110 determines that it cannot communicate with any of the radio terminals 111 to 113 (the terminal cluster 101) belonging to the same group 1 as the radio terminal 110.

In block 703, the radio terminal 110 receives a communication setting for inter-group communication from one of the radio terminals in the terminal cluster 102 belonging to the group 2 (e.g., radio terminal 121). This communication setting includes a group identifier (e.g., ProSe Layer-2 Group ID) of the group 2, or radio resource information, or both. In some implementations, the radio terminal belonging to the group 2 (e.g., radio terminal 121) may always broadcast this communication setting. Alternatively, the radio terminal belonging to the group 2 (e.g., radio terminal 121) may broadcast this communication setting in response to reception of a detection signal (702) sent from the radio terminal 110. The detection signal (702) may include information related to the group 1 (e.g., identifier of the group 1).

Processes in blocks 704 and 705 in FIG. 7 are similar to those in blocks 202 and 203 in FIG. 2 or those in blocks 602 and 603 in FIG. 6.

In block 707, a radio terminal in the terminal cluster 101 belonging to the group 1 (e.g., radio terminal 113) receives the communication setting for inter-group communication from one of the radio terminals in the terminal cluster 102 belonging to the group 2 (e.g., radio terminal 123). This communication setting includes a group identifier (e.g., ProSe Layer-2 Group ID) of the group 2, or radio resource information, or both. In some implementations, the radio terminal belonging to the group 2 (e.g., radio terminal 123) may always broadcast this communication setting. Alternatively, the radio terminal belonging to the group 2 (e.g., radio terminal 123) may broadcast this communication setting in response to reception of a search signal (706) sent from a radio terminal in the terminal cluster 101 (e.g., radio terminal 113). The search signal (706) may include an identifier of the radio terminal 110.

A process in block 708 in FIG. 7 is similar to that in block 204 in FIG. 2 or that in block 608 in FIG. 6.

According to this embodiment, a radio terminal acquires a communication setting for D2D communication when it needs to perform the inter-group D2D communication and thus can use the communication setting suitable for the environment and the condition in which the D2D communication is performed.

Fourth Embodiment

This embodiment provides a more specific example of the inter-group D2D communication procedure explained in the first embodiment, in particular, a method for carrying out a communication setting for inter-group D2D communication. A configuration example of a radio network according to this embodiment is the same as that shown in FIG. 1. In this embodiment, each of the radio terminals 121 to 124 belonging to the group 2 is configured to receive a communication setting related to inter-group D2D communication from one of the radio terminals 110 to 113 belonging to the group 1.

Figure 8:
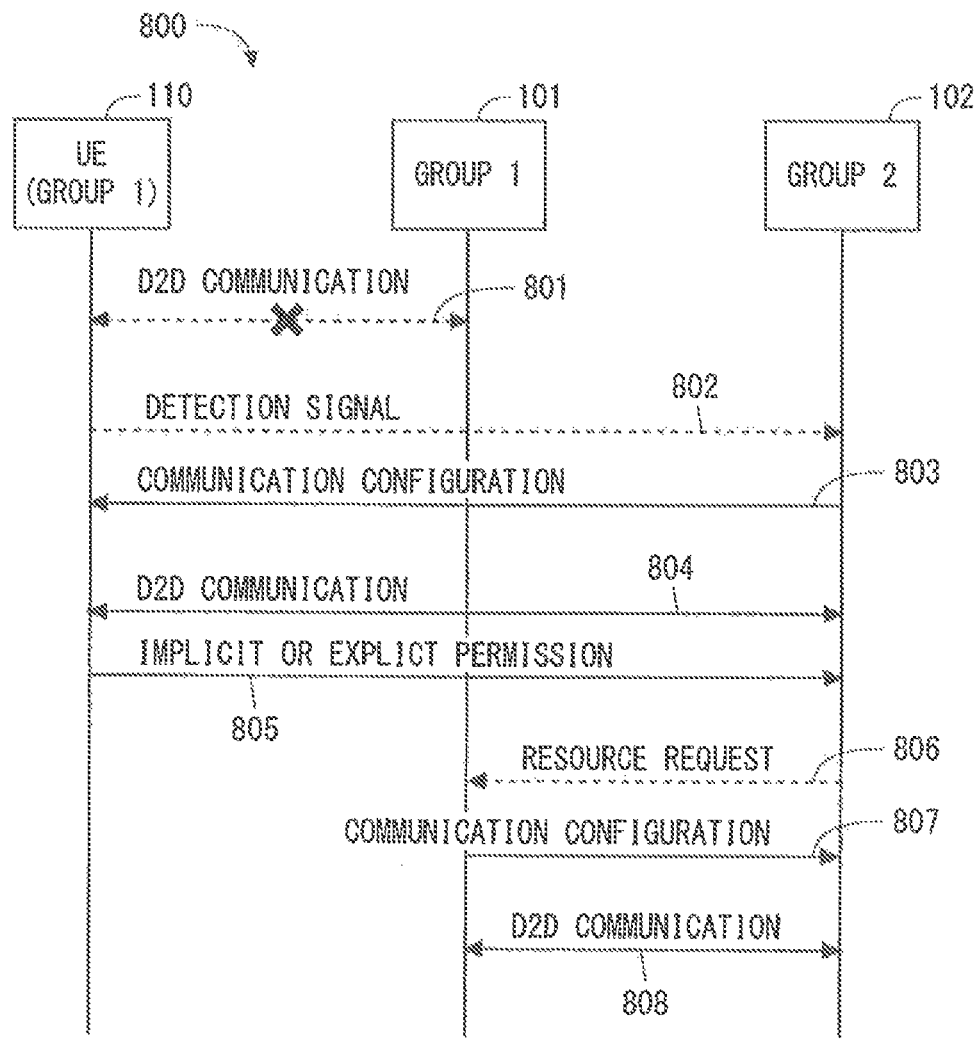
FIG. 8 is a sequence diagram showing an example of an inter-group D2D communication procedure according to a fourth embodiment.

FIG. 8 is a sequence diagram showing an example of an inter-group D2D communication procedure (a process 800) according to this embodiment. Processes in blocks 801 to 805 in FIG. 8 are similar to those in blocks 701 to 705 in FIG. 7.

In block 807, a radio terminal in the terminal cluster 102 belonging to the group 2 (e.g., radio terminal 123) receives a communication setting for inter-group communication from a radio terminal in the terminal cluster 101 belonging to the group 1 (e.g., radio terminal 121). This communication setting includes a group identifier (e.g., ProSe Layer-2 Group ID) of the group 1, or radio resource information, or both. In some implementations, the radio terminal belonging to the group 1 (e.g., radio terminal 113) may always broadcast this communication setting. Alternatively, the radio terminal belonging to the group 1 (e.g., radio terminal 113) may broadcast this communication setting in response to reception of a resource request (806) sent from a radio terminal in the terminal cluster 102 (e.g., radio terminal 123). Additionally or alternatively, the radio terminal belonging to the group 1 (e.g., radio terminal 113) may broadcast this communication setting in response to detecting that it cannot perform D2D communication with the radio terminal 110 belonging to the group 1.

A process in block 808 in FIG. 8 is similar to that in block 204 in FIG. 2, that in block 608 in FIG. 6, or that in block 708 in FIG. 7.

According to this embodiment a radio terminal acquires a communication setting for D2D communication, when it needs to perform inter-group D2D communication, and thus the radio terminal can use the communication setting suitable for the environment and the condition in which the D2D communication is performed.

Fifth Embodiment

In the second to fourth embodiments, examples in which a radio terminal acquires a communication setting for inter-group D2D communication from the radio infrastructure network 160 or another radio terminal are shown. However, at least a part of the communication setting for inter-group D2D communication may be pre-configured in the radio terminal. The pre-configured communication setting is stored in a built-in memory installed in the radio terminal, or a removable memory (e.g., Universal Integrated Circuit Card (UICC)) with which the radio terminal can communicate through an interface. The built-in memory or the removable memory is a volatile memory, a non-volatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof.

The UICC is a smart card used in a cellular communication system such as a GSM system, a UMTS, and an LTE system. The UICC includes a processor and a memory and executes a Subscriber Identity Module (SIM) application or a Universal Subscriber Identity Module (USIM) application for network authentication. In a strict sense, the UICC is different from the UIM, the SIM, and the USIM. However, these terms are often used synonymously. Accordingly, while the present application mainly employs the term UICC, the term UICC as used herein may mean the UIM, the SIM, the USIM or the like.

Figure 9:
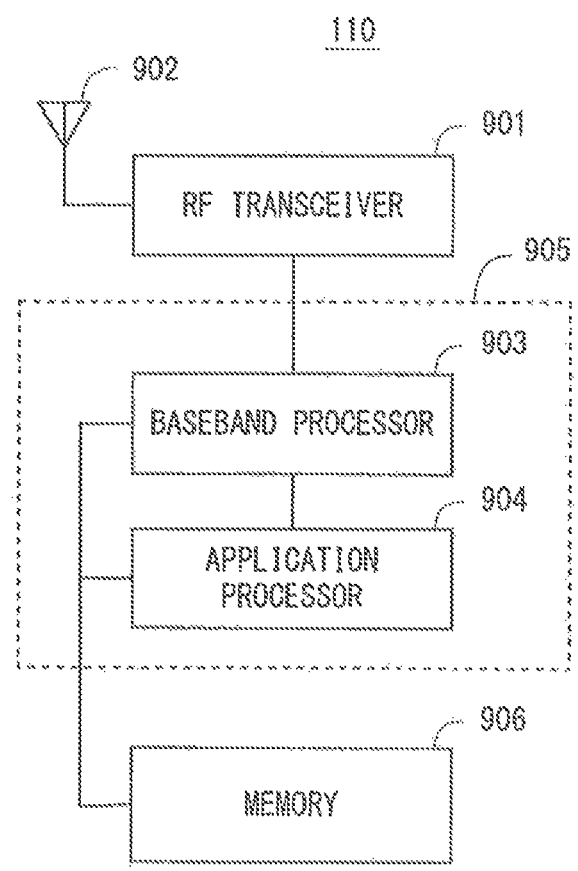
FIG. 9 shows a configuration example of a radio terminal according to some embodiments.

Lastly, configuration examples of the radio terminals 110 to 113 and the radio terminals 121 to 124 according to the above-described embodiments will be described. FIG. 9 is a block diagram showing a configuration example of the radio terminal 110. Each of the other radio terminals 111 to 113 and the radio terminals 121 to 124 may have a configuration similar to that shown in FIG. 9. A Radio Frequency (RF) transceiver 901 performs an analog RF signal processing to communicate with a base station or an access point in the radio infrastructure network 160. The RF transceiver 901 is also used for D2D communication. The RF transceiver 901 may include a first transceiver used for communication with the radio infrastructure network 160 and a second transceiver used for D2D communication. The analog RF signal processing performed by the RF transceiver 901 includes a frequency up-conversion, a frequency down-conversion, and amplification. The RF transceiver 901 is coupled to an antenna 902 and a baseband processor 903. That is, the RF transceiver 901 receives modulated symbol data (or OFDM symbol data) from the baseband processor 903, generates a transmission RF signal, and supplies the generated transmission RF signal to the antenna 902. Further, the RF transceiver 901 generates a baseband reception signal based on a reception RF signal received by the antenna 902 and supplies the generated baseband reception signal to the baseband processor 903.

The baseband processor 903 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

The baseband processor 903 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control plane processing. In this case, the protocol stack processor, which performs the control plane processing, may be integrated with an application processor 904 described in the following.

The application processor 904 may also be referred to as a CPU, an MPU, a microprocessor, or a processor core. The application processor 904 may include a plurality of processors (processor cores). The application processor 904 loads a system software program (Operating System (OS)) and various application programs (e.g., voice call application, WEB browser, mailer, camera operation application, and music player application) from a memory 906 or from another memory (not shown) and executes these programs, thereby providing various functions of the radio terminal 110.

In some implementations, as represented by a dashed line (905) in FIG. 13, the baseband processor 903 and the application processor 904 may be integrated on a single chip. In other words, the baseband processor 903 and the application processor 904 may be implemented in a single System on Chip (SoC) device 905. A SoC device may be referred to as a system Large Scale Integration (LSI) or a chipset.

The memory 906 is a volatile memory, a non-volatile memory, or a combination thereof. The memory 906 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 906 may include, for example, an external memory device that can be accessed by the baseband processor 903, the application processor 904, and the SoC 905. The memory 906 may include an internal memory device that is integrated in the baseband processor 903, the application processor 904, or the SoC 905. Further, the memory 906 may include a memory in a Universal Integrated Circuit Card (UICC).

The memory 906 may store software module (computer program) including instructions and data to perform processing by the radio terminal 110 described in the aforementioned embodiments. In some implementations, the baseband processor 903 or the application processor 904 may be configured to load the software module from the memory 906 and execute the loaded software module, thereby performing the processing of the radio terminal 110 described in the aforementioned embodiments.

As explained above with reference to FIG. 9, each of the processors included in the radio terminals 110 to 113 and the radio terminals 121 to 124 according to the above-described embodiments executes one or more programs including instructions to cause a computer to perform an algorithm explained with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or wireless communication path.

Other Embodiments

Each of the above-described embodiments may be used individually, or two or more of the embodiments may be appropriately combined with one another.

The above-described first, third and fourth embodiments can be applied even when any of the radio terminals 110 to 113 and the radio terminals 121 to 124 cannot communicate with the radio infrastructure network 160.

Further, the above-described embodiments are merely examples of applications of the technical ideas obtained by the inventor. Needless to say, these technical ideas are not limited to the above-described embodiments and various modifications can be made thereto.

This application is based upon and claims the benefit of priority from Japanese patent application No. 2015-069028, filed on Mar. 30, 2015, the disclosure of which is incorporated herein in its entirety by reference.

REFERENCE SIGNS LIST

101, 102 TERMINAL CLUSTER
110-113, 121-124 RADIO TERMINAL
141, 142 INTER-GROUP D2D COMMUNICATION
160 RADIO INFRASTRUCTURE NETWORK

The invention claimed is:
1. A radio terminal apparatus comprising:
at least one radio transceiver; and
at least one processor coupled to the at least one radio transceiver, wherein
the at least one processor is configured to perform device-to-device (D2D) communication by using the at least one radio transceiver,
the at least one processor is configured to perform D2D communication with at least one radio terminal belonging to a second group when a predetermined condition is satisfied, the predetermined condition including that a first radio terminal belonging to a first group to which the radio terminal apparatus belongs gives, to the second group different from the first group, implicit or explicit permission to perform D2D communication between the first and second groups, and
the at least one processor is configured to broadcast a communication setting related to D2D communication between the radio terminal apparatus and the second group when the radio terminal apparatus cannot communicate with the first radio terminal directly or through another radio terminal belonging to the first group.

2. The radio terminal apparatus according to claim 1, wherein the implicit or explicit permission is given by the first radio terminal by performing at least one of:
   requesting a radio terminal belonging to the second group to perform D2D communication;
   performing D2D communication with a radio terminal belonging to the second group;
   notifying a radio terminal belonging to the second group of a communication setting necessary for D2D communication between the first and second groups;
   asking a radio terminal belonging to the second group for data transmission to the first group; and
   transmitting explicit permission information to a radio terminal belonging to the second group.

3. The radio terminal apparatus according to claim 2, wherein the communication setting necessary for D2D communication between the first and second groups includes one or both of an identifier related to the first group and radio resource information.

4. The radio terminal apparatus according to claim 1, wherein the predetermined condition further includes that the radio terminal apparatus cannot communicate with the first radio terminal directly or through another radio terminal belonging to the first group.

5. The radio terminal apparatus according to claim 1, wherein the at least one processor is configured to receive from a network the communication setting related to D2D communication between the radio terminal apparatus and the second group.

6. The radio terminal apparatus according to claim 1, wherein the at least one processor is configured to transmit the communication setting related to D2D communication between the radio terminal apparatus and the second group in response to a request sent from a radio terminal belonging to the second group.

7. The radio terminal apparatus according to claim 1, wherein the at least one processor is configured to perform D2D communication within the first group by using a dedicated radio resource exclusively configured for the first group and perform inter-group D2D communication by using a common radio resource commonly configured for a plurality of groups including the first and second groups.

8. The radio terminal apparatus according to claim 1, wherein the at least one processor is configured to restrict communication quality or a communication content in D2D communication between the radio terminal apparatus and the second group compared to that in D2D communication performed within the first group.

9. The radio terminal apparatus according to claim 1, wherein the D2D communication includes at least one of direct communication and direct discovery.

10. A radio terminal apparatus comprising:
   at least one radio transceiver; and
   at least one processor coupled to the at least one radio transceiver, wherein
   the at least one processor is configured to perform device-to-device (D2D) communication by using the at least one radio transceiver,
   the at least one processor is configured to, when the radio terminal apparatus cannot communicate with any radio terminal belonging to a first group to which the radio terminal apparatus belongs, perform D2D communication with a first radio terminal belonging to a second group different from the first group and give implicit or explicit permission to the second group, and
   the implicit or explicit permission permits the second group to perform D2D communication with a radio terminal that belongs to the first group and is different from the radio terminal apparatus.

11. The radio terminal apparatus according to claim 10, wherein the implicit or explicit permission is given by the radio terminal apparatus by performing at least one of:
   requesting the first radio terminal to perform D2D communication;
   performing D2D communication with the first radio terminal;
   notifying the first radio terminal of a communication setting necessary for D2D communication between the first and second groups;
   asking the first radio terminal for data transmission to the first group; and
   transmitting explicit permission information to the first radio terminal.

12. The radio terminal apparatus according to claim 11, wherein the communication setting includes one or both of an identifier related to the first group and radio resource information.

13. The radio terminal apparatus according to claim 10, wherein the at least one processor is configured to receive from a network a communication setting related to D2D communication between the radio terminal apparatus and the second group.

14. The radio terminal apparatus according to claim 13, wherein the second group is selected from a plurality of groups by the network based on at least one of: a distance between the radio terminal apparatus and a radio terminal belonging to the second group; a type of an application used by the radio terminal apparatus in D2D communication; and an attribute of the radio terminal apparatus or the first group.

15. The radio terminal apparatus according to claim 10, wherein the at least one processor is configured to receive from the first radio terminal a communication setting related to D2D communication between the radio terminal apparatus and the second group.

16. The radio terminal apparatus according to claim 10, wherein the at least one processor is configured to perform D2D communication between the radio terminal apparatus and the first radio terminal in accordance with a communication setting pre-configured in the radio terminal apparatus.

17. A method performed by a radio terminal apparatus configured to perform device-to-device (D2D) communication with a radio terminal by using at least one radio transceiver, the method comprising:
   performing D2D communication with at least one radio terminal belonging to a second group when a predetermined condition is satisfied, the predetermined condition including that a first radio terminal belonging to a first group to which the radio terminal apparatus belongs gives, to the second group different from the first group, implicit or explicit permission to perform D2D communication between the first and second groups;
   wherein the method further comprises broadcasting a communication setting related to D2D communication between the radio terminal apparatus and the second group when the radio terminal apparatus cannot communicate with the first radio terminal directly or through another radio terminal belonging to the first group.

* * * * *